April 27, 1965   J. A. BARNES   3,180,330
SUPERCHARGING RECIPROCATING INTERNAL-COMBUSTION ENGINES
Filed March 6, 1961
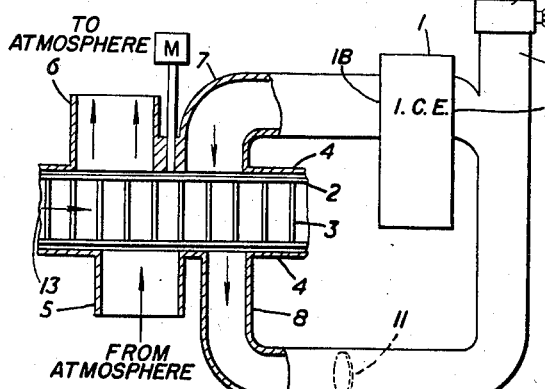
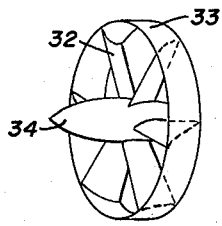
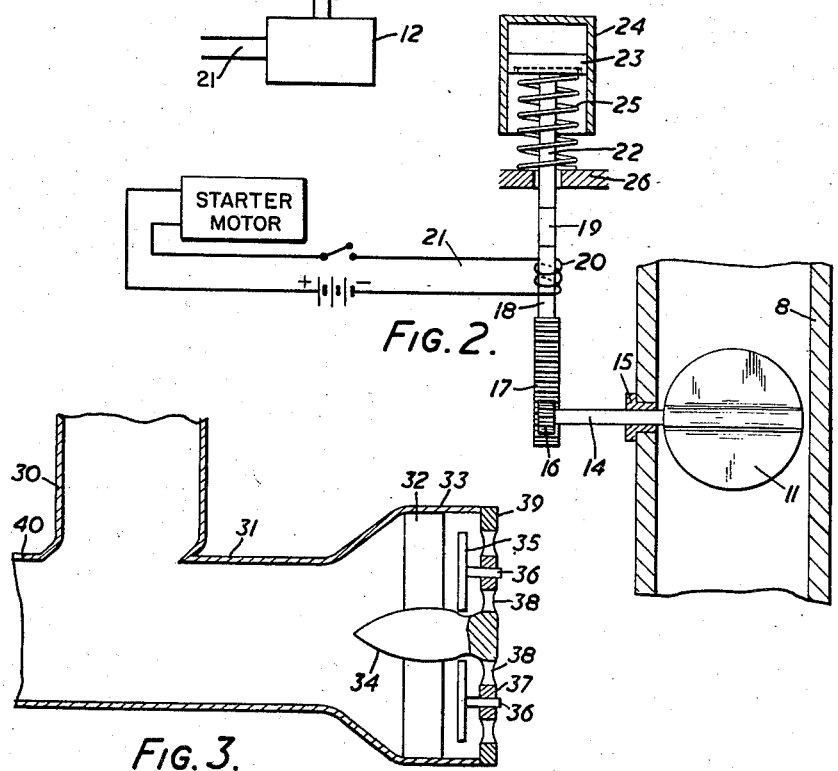
INVENTOR
John Anthony Barnes
BY
Lawson and Taylor
ATTORNEY

United States Patent Office 3,180,330
Patented Apr. 27, 1965

3,180,330
SUPERCHARGING RECIPROCATING INTERNAL-COMBUSTION ENGINES
John Anthony Barnes, Wokingham, England, assignor to Power Jets (Research & Development) Limited, London, England, a British company
Filed Mar. 6, 1961, Ser. No. 93,772
Claims priority, application Great Britain, Mar. 11, 1960, 8,774/60; May 4, 1960, 15,756/60
3 Claims. (Cl. 123—179)

This invention relates to the supercharging of reciprocating internal-combustion engines by means of a pressure exchanger.

The term "pressure exchanger" is used herein to mean apparatus comprising cells in which one gas quantity expands so compressing another gas quantity with which it is in direct contact, ducting to lead gas substantially steadily to and from the cells at different pressures, and means to effect relative motion between the cells and the ducting.

In one form of pressure exchanger, sometimes termed a pressure interchanger, at a low pressure scavenging stage a gas quantity already in the cells before reaching that stage is replaced by another gas quantity at a relatively low pressure (generally atmospheric) whilst at a high pressure scavenging stage the relatively low pressure gas quantity is compressed and scavenged by a relatively high pressure gas quantity, the relatively high pressure gas quantity now at a lower pressure being the same as the first mentioned gas quantity.

It has been proposed to supercharge a reciprocating internal-combustion engine by means of a pressure exchanger, the high pressure scavenging stage inlet communicating with the engine exhaust and the high pressure scavenging stage outlet communicating with the engine inlet manifold. This arrangement is not, however, self-starting in some instances.

According to the invention in one aspect a power plant includes a reciprocating internal-combustion engine, a pressure exchanger having a low pressure scavenging stage and a high pressure scavenging stage each stage having inlet and outlet ports leading respectively to and from the cells, a duct in communication with the outlet port of the high pressure scavenging stage and the engine inlet manifold, an engine starter, a valve interposed in the duct, and control means common to the starter and the valve whereby on actuation of the starter the valve operates to substantially close the duct.

Preferably the starter is an electric motor, and a solenoid is arranged to operate the valve, the solenoid being connected in the starter motor circuit.

According to the invention in another aspect, an aerodynamic valve includes two confluent flow passages, one flow passage being provided with swirl vanes which under one set of operating conditions for the valve are operable to produce a centrifugal pressure gradient across one of the passages at the confluence of the passages whereby fluid flow from the other flow passage into the confluence is inhibited; whilst under another set of operating conditions the pressure in the said other passage is sufficient to substantially prevent flow over the swirl vanes and a non-return valve prevents flow reversal in the said one passage.

An embodiment in accordance with each of the aspects of the invention will now be described, by way of example, with reference to the accompanying diagrammatic drawing.

FIGURE 1 shows a reciprocating internal-combustion engine arranged to be supercharged by a pressure exchanger in accordance with the first aspect of the invention;

FIGURE 2 shows a section through a valve and control device forming part of the arrangement of FIGURE 1; and FIGURES 3 and 3A show respectively sections through an aerodynamic valve in accordance with the second aspect of the invention and a perspective view of a detail of the valve.

In FIGURE 1 a reciprocating internal-combustion engine 1 having an inlet manifold 1A and an exhaust manifold 1B is connected for supercharging by means of a pressure exchanger having a cell ring 2, cells 3 and end-plates 4. A motor M forms means to effect relative rotation between the cells 3 and the end-plates 4. The pressure exchanger is shown as a development as is conventional in the pressure exchanger art. Duct connections to lead gas to and from the cells of the pressure exchanger include a low pressure scavenging stage inlet duct 5 and outlet duct 6, and a high pressure scavenging stage inlet duct 7 and outlet duct 8. Each duct connection is associated with a port in the appropriate end-plate 4. Both the low pressure scavenging stage ducts 5, 6 communicate directly with atmosphere.

The high pressure scavenging stage inlet duct 7 is connected to the exhaust manifold 1B of the engine 1 and the high pressure scavenging stage outlet duct 8 communicates with the engine inlet manifold 1A. A branch duct 9 serves to supply combustion air from the atmosphere to the engine 1 under starting conditions and has a shut-off valve 10 which is closed under normal operating conditions. Interposed along the length of the duct 8, a butterfly valve 11 (shown only by a broken line in FIGURE 1 but in detail in FIGURE 2) having a control device 12 serves substantially to close the duct 8 under starting conditions as will be referred to in detail hereinafter.

In operation, the cell ring is rotated by the motor M in a direction indicated by an arrow 13. Exhaust gases from the internal-combustion engine 1, which have entered the cells from the inlet duct 7 as will be described hereinafter, leave the cells through the outlet duct 6 and the resultant drop in pressure in the cells ensures that fresh air is drawn into the cells through the inlet duct 5. To ensure that the engine 1 receives only clean fresh air the circumferential extent of the port terminating the duct 6 is sufficient to permit direct passage of fresh air through the cells from the inlet duct 5. The amount of air which passes directly through the cells should be kept to a minimum to avoid undue losses. The cells 3, filled with clean fresh air, are then opened in turn to the high pressure scavenging stage inlet duct 7 and hot engine exhaust gases enter the cells and compress the air already in the cells. The air thus compressed leaves the cells through the port of the outlet duct 8 and passes through that duct to the inlet 1A of the internal-combustion engine 1. Under these circumstances the butterfly valve 11 is open and the valve 10 shut. Under starting conditions, if the valves 10 and 11 were both open, the engine would draw in air both from the atmosphere through the valve 10 and through the high-pressure scavenging stage outlet duct 8, thereby evacuating the cells open to the duct 8. Under these conditions, the cells leaving the high-pressure scavenging stage would contain air at sub-atmospheric pressure instead of containing exhaust gases at super-atmospheric pressure as in normal operation. The sub-atmospheric condition in the cells would result in a flow of atmospheric air into the cells through the low-pressure scavenging stage outlet duct 6 and an outflow of air through the low-pressure scavenging stage inlet duct 5, thus establishing operation with gas flow at the low-pressure scavenging stage in the wrong direction. This can be overcome by closing the valve 11 as explained in detail with reference to FIGURE 2.

Referring now to FIGURE 2, the duct 8 contains the butterfly valve 11 mounted on a spindle 14 pivotable in a bush 15 which is itself mounted in the wall of the duct. A pinion 16 is mounted on the end of the spindle remote from the butterfly valve 11 and this engages a rack 17 which serves to control the position of the butterfly valve. In FIGURE 2 the butterfly valve is shown in an open position. The rack 17 has an extension 18 of a non-magnetic material which is itself secured to an armature 19 capable of being attracted by a solenoid 20 electrically connected in the starter motor circuit 21 of the internal-combustion engine 1. The starter motor itself is of conventional type and hence has not been illustrated.

Beyond the armature 19, a further extension 22 carries a piston 23 movable in a cylinder 24, the piston constituting a dash-pot. The piston 23 also serves as an abutment for a compression spring 25 which serves to return the butterfly valve 11 to an open position whenever the solenoid 20 is de-energized. The compression spring 25 abuts at the end remote from the piston against a fixed collar 26.

It has been found in practice, that when a pressure exchanger is connected as a supercharger for an internal-combustion engine in the manner illustrated in FIGURE 1, during starting operation the direction of flow of working fluid in the cells of a pressure exchanger may be reversed from the desired direction. To avoid this, the butterfly valve 11 is closed by energization of the solenoid 20. As soon as the starter motor circuit is de-energized, the butterfly valve 11 opens slowly at a rate controlled by the spring 25 and the dash-pot 23, 24. By this time, the exhaust gases from the internal-combustion engine will have established flow of working fluid in the cells of the pressure exchanger in the correct direction. During normal operation, the butterfly valve 11 remains open and presents only a small resistance to fluid flow. It should be noted that in practice a butterfly valve, such as that shown, need not be a tight fit in the duct 1 as some movement of working fluid is tolerable.

Referring now to FIGURE 3, an aerodynamic valve in accordance with the second aspect of the invention includes two confluent flow passages 30, 31 (the passage 30 corresponding as regards position to the duct 8 of FIGURE 1 and the longitudinal axis of the passage 31 being co-incident with that of the inlet manifold of the reciprocating internal combustion engine) and a set of swirl vanes 32 arranged in an enlargement 33 of the passage 31. The swirl vanes 31 are shown in more detail in FIGURE 3A. A central bullet 34 serves in part to support the swirl vanes 32. The enlargement 33 also contains a non-return valve which includes discs 35 having guide members 36 slidable in bores in bosses 37. Each boss 37 is supported by a spider 38 and the spiders are mounted on a support 39. The passage 30 joins the passage 31 in a smooth curve. After the confluence, the two passages form a single passage 40. As applied to an arrangement as shown in FIGURE 1, the aerodynamic valve is conveniently situated at the confluence of the duct 8 and the branch duct 9. The valves 10 and 11 would, of course, be omitted.

If the valve is situated at the confluence of the duct 8 and the branch duct 9, under starting conditions, the pressure exchanger provides substantially no boost and the internal-combustion engine to be supercharged can draw in air not only through the passage 40 and the passage 31, the valves 35 being open, but also through the high-pressure outlet duct 30 of the pressure exchanger. This cannot be permitted as flow would then take place through the cells of the presure exchanger in a direction which is the reverse to that required as explained in detail with reference to FIGURE 1. Under these conditions, the swirl vanes 32 induce an annulus of high pressure air in a known manner adjacent the inner wall of the passage 31. This annulus extends from the swirl vanes 32, across the confluence of the passages 30, 31 and into the passage 40. The annulus of high pressure air prevents flow of air for the time being at a lower pressure, from the passage 30 into the passage 40. As soon as the pressure exchanger produces a useful degree of supercharging pressure, the pressure effect of the swirl vanes is overcome and the engine is aspirated at an elevated pressure in the normal way. The non-return valve is closed by movement of the discs 35 which then seat on the support 39.

It will be appreciated that except for the simple non-return valve, the aerodynamic valve includes no moving parts and is fully automatic in action. Although the operation of the aerodynamic valve has, for convenience, been described in conjunction with the embodiment of FIGURE 1, it will be seen that its mode of operation is similar under analogous conditions.

What I claim is:

1. A power plant incorporating a reciprocating internal-combustion engine, an inlet manifold for the internal-combustion engine, a pressure exchanger including a cell rotor, a plurality of open-ended cells arranged around the cell rotor, end-plate structure effective to close the ends of the cells but having inlet and outlet ports therein for the admission of fluid to and the extraction of fluid from the cells, means to effect relative rotation between the cells and the end-plate structure, a high-pressure scavenging stage including one of the inlet ports and one of the outlet ports in the end-plate structure and a low-pressure scavenging stage, an outlet duct in communication with the outlet port of the high-pressure scavenging stage and the engine inlet manifold, valve means interposed in the outlet duct, an engine starter motor, control means common to the starter motor and the valve means, means to connect the engine starter motor to said control means, said control means being operable to actuate the valve means so as to substantially close the outlet duct on actuation of the starter motor, which closure of the outlet duct ensures the correct direction of flow of fluid through the high and low-pressure scavenging stages of the pressure exchanger.

2. A power plant incorporating a reciprocating internal-combustion engine, an inlet manifold for the internal-combustion engine, a pressure exchanger including a cell rotor, a plurality of open-ended cells arranged around the cell rotor, end-plate structure effective to close the ends of the cells but having inlet and outlet ports therein for the admission of fluid to and the extraction of fluid from the cells, means to effect relative rotation between the cells and the end-plate structure, a high-pressure scavenging stage including one of the inlet ports and one of the outlet ports in the end-plate structure and a low-pressure scavenging stage, an outlet duct in communication with the outlet port of the high-pressure scavenging stage and the engine inlet manifold, valve means interposed in the outlet duct, an engine starter electric motor, an electrical circuit to connect said engine starter electric motor to said valve means, a solenoid connected in the electric motor circuit, said solenoid being operable to actuate the valve means so as to substantially close the outlet duct on actuation of the starter motor, which closure of the outlet duct ensures the correct direction of flow of fluid through the high and low-pressure scavenging stages of the pressure exchanger.

3. A power plant incorporating a reciprocating internal-combustion engine, an inlet manifold for the internal-combustion engine, a pressure exchanger including a cell rotor, a plurality of open-ended cells arranged around the cell rotor, end-plate structure effective to close the ends of the cells but having inlet and outlet ports therein for the admission of fluid to and the extraction of fluid from the cells, means to effect relative rotation between the cells and the end-plate structure, a high-pressure scavenging stage including one of the inlet ports and one of the outlet ports in the end-plate structure and a low-pressure scavenging stage, an outlet duct in communication with the outlet port of the high-pressure scavenging stage and the engine inlet manifold, aerodynamic valve means including two confluent flow passages, one passage communicating with the engine inlet manifold and the other passage communicating with the outlet port of the high-pressure scavenging stage, swirl vanes and a non-return valve positioned in one of said passages upstream of the confluence of said two confluent flow passages, which non-return valve is operable to permit flow in said one passage in a direction towards said confluence, and which vanes, during starting operation of the engine, are effective to produce a pressure gradient across the said other passage at the confluence of the passages whereby fluid flow from the said other passage into the confluence is inhibited, whilst during normal running of the engine the pressure in the said other passage is sufficient to substantially prevent flow over the swirl vanes, and the non-return valve prevents flow reversal in the said one passage.

References Cited by the Examiner

UNITED STATES PATENTS

| | | | |
|---|---|---|---|
| 2,255,424 | 9/41 | Jandasek | 123—179 |
| 2,332,244 | 10/43 | Martin | 137—608 |
| 2,345,360 | 3/44 | Smith et al. | 137—608 |
| 2,606,545 | 8/52 | Sommer | 123—179 |
| 2,799,264 | 7/57 | Stegemann | 123—179 |
| 2,853,987 | 9/58 | Berchtold et al. | 230—69 X |
| 2,931,350 | 4/60 | Heftler | 123—179 |
| 2,952,982 | 9/60 | Spalding | 60—39.45 |

KARL J. ALBRECHT, *Acting Primary Examiner.*

DON A. WAITE, RICHARD B. WILKINSON,
*Examiners.*